(12) United States Patent
Hooper

(10) Patent No.: US 11,334,639 B2
(45) Date of Patent: May 17, 2022

(54) SYSTEMS AND METHODS FOR IMAGE CAPTURE AND IDENTIFICATION

(71) Applicant: Wudzy Pty. Limited, Lysterfield (AU)

(72) Inventor: Jodie Michelle Hooper, Lysterfield (AU)

(73) Assignee: Wudzy Pty. Limited, Lysterfield (AU)

( * ) Notice: Subject to any disclaimer, the term of this patent is extended or adjusted under 35 U.S.C. 154(b) by 248 days.

(21) Appl. No.: 16/679,978

(22) Filed: Nov. 11, 2019

(65) Prior Publication Data

US 2020/0159802 A1    May 21, 2020

Related U.S. Application Data

(60) Provisional application No. 62/768,204, filed on Nov. 16, 2018.

(51) Int. Cl.
*G06F 16/00* (2019.01)
*G06F 16/9538* (2019.01)
*G06F 16/9536* (2019.01)
*G06F 16/78* (2019.01)
*G06F 16/58* (2019.01)

(52) U.S. Cl.
CPC ...... *G06F 16/9538* (2019.01); *G06F 16/5866* (2019.01); *G06F 16/7867* (2019.01); *G06F 16/9536* (2019.01)

(58) Field of Classification Search
CPC ............. G06F 16/9538; G06F 16/9536; G06F 16/7867; G06F 16/5866; G06K 9/00624; G06K 9/00677
See application file for complete search history.

(56) References Cited

U.S. PATENT DOCUMENTS

| 10,007,729 | B1 * | 6/2018 | Reed | G06F 16/951 |
| 2007/0250479 | A1 * | 10/2007 | Lunt | G06Q 10/10 |
| 2012/0233143 | A1 * | 9/2012 | Everingham | G06F 16/9032 |
| | | | | 707/706 |
| 2013/0004138 | A1 * | 1/2013 | Kilar | H04N 21/4788 |
| | | | | 386/230 |
| 2014/0199046 | A1 * | 7/2014 | Lindsey | H04N 9/8707 |
| | | | | 386/244 |
| 2016/0210602 | A1 * | 7/2016 | Siddique | G06Q 20/384 |
| 2016/0330082 | A1 * | 11/2016 | Bliss | H04L 41/0873 |
| 2017/0221156 | A1 * | 8/2017 | Mingarelli | G06Q 50/01 |
| 2017/0235767 | A1 * | 8/2017 | Tusk | G06F 16/5838 |
| | | | | 707/706 |

FOREIGN PATENT DOCUMENTS

CN    102664895 B   *  3/2015

OTHER PUBLICATIONS

SearchTeam. Search the web together with friends. <https://web.archive.org/web/20110725012420/https://ww1.prweb.com/prfiles/2011/07/11/8594099/SearchTeam-AnnotatedScreenshots.pdf> (Year: 2011).*

* cited by examiner

*Primary Examiner* — Syed H Hasan
(74) *Attorney, Agent, or Firm* — K&L Gates LLP

(57) ABSTRACT

The present disclosure provides a system for a user to upload a photo of an image object and an associated question related to the image object. If the system can determine a direct match based on previously stored image objects in a database correctly, the user can verify that the system generated answer is correct. If the system cannot identify the image object from the database, the system can rely on other users of the application to help identify and comment on the image object to determine the answers to the user's questions about the image object.

9 Claims, 9 Drawing Sheets

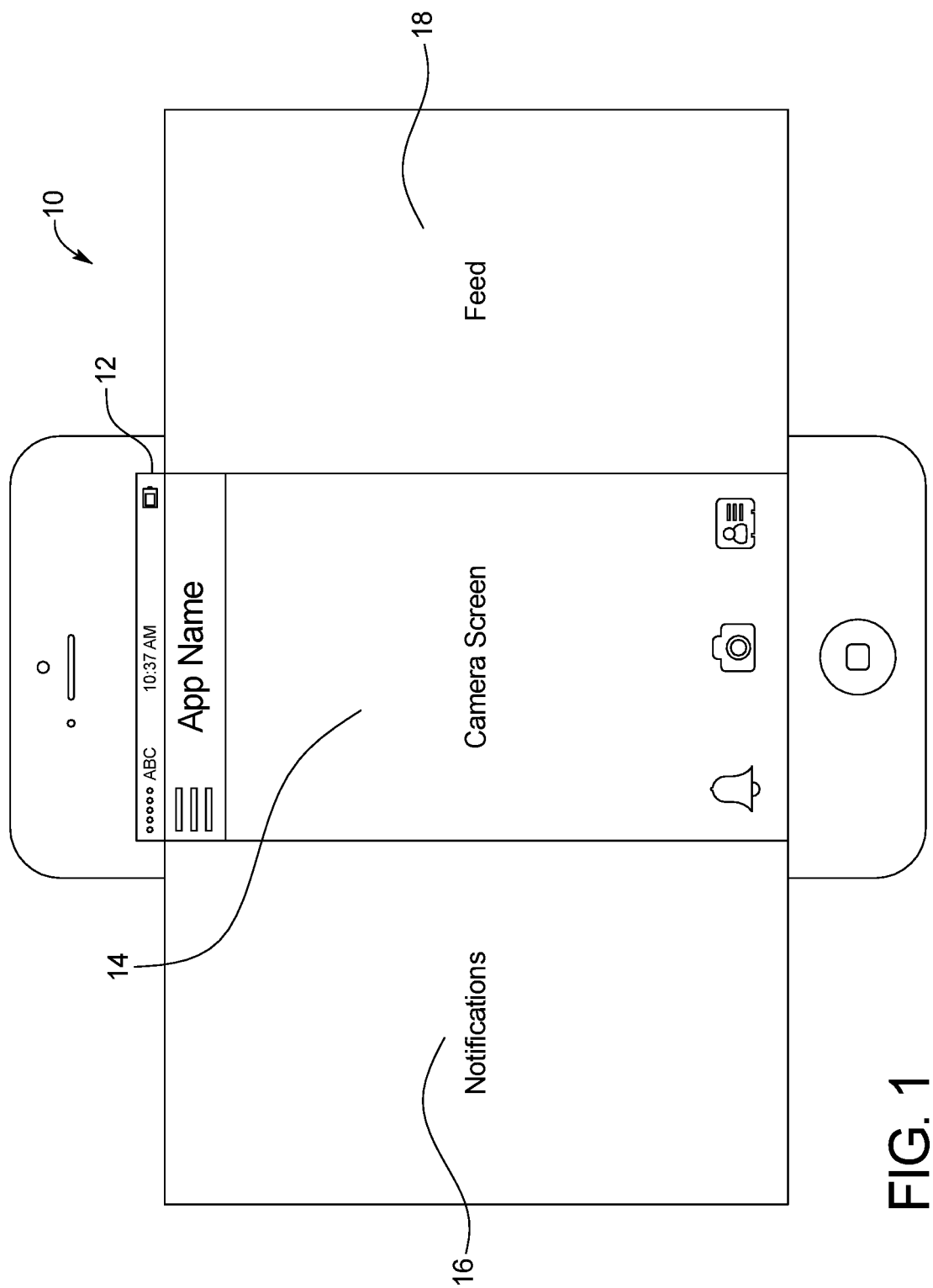

FIG. 12

SYSTEMS AND METHODS FOR IMAGE CAPTURE AND IDENTIFICATION

CROSS-REFERENCE TO RELATED APPLICATIONS

This application incorporates by reference and claims the benefit of priority to U.S. Provisional Application 62/768,204 filed on Nov. 16, 2018.

BACKGROUND OF THE INVENTION

The present subject matter relates generally to systems and methods for searching and providing information related to images.

Often people observe products, clothing, and accessories on a person in real time, but have no way of identifying the item. Searching on the internet using a word description is typically fruitless.

Traditional image search technologies rely on a user being able to describe what they are searching for in terms of keywords. Such technology is successful in only limited cases and entirely useless when what one is searching for can only be expressed by an image (e.g., pointing to an object or another photo).

Moreover, if one takes a picture and uploads the item for identification using conventional reverse image searching, the system may or may not provide the identification of the image, much less additional information related to the image. For example, a person may want the answer to a specific question related to the image, not just identification of the image object itself.

Accordingly, there is a need for a platform that provides reverse image search results from a multidimensional input request that generates results from a plurality of sources.

BRIEF SUMMARY OF THE INVENTION

The present disclosure provides a system related to reverse image search technology based on multidimensional input and generates results based on a combination of sources. Various examples of the systems and methods are provided herein.

In an example, the present system enables a user to upload a photo of an image object from their smart device (e.g., phone, computer, etc.) for identification and information about the image object. The term image object can include a plurality of subjects including, but not limited to, people, products, accessories, activities, sports, landmarks, buildings, etc. For example, the system can be used to identify key figures in history by uploading photos of subjects such as Winston Churchill, Gandhi, Lincoln, among others. The system can be used to identify and learn (e.g., history, location, data) about famous buildings by uploading a picture of the Eiffel Tower, Chrysler Building, etc. In yet another example, the system can be used to identify, locate, and explain the name and function of a machine or mechanical part by uploading a photo of the item. By uploading photos of plants, constellations, trees, flowers, plants, etc., the system can identify the subject matter and provide additional data related to the subject. In yet another example, a user can upload a photo of a place or location (e.g., resort, hotel, spa, salon, etc.) and the system can identify the location (e.g., via map functionality), business, and provide the information for booking the hotel, vacation, resort, etc.

In an example, if a user sees a hand bag that they like and would want to know more about the bag, such as the brand, or where it is sold, they can upload the photo of the hand bag and ask a specific question such as, "What bag is this and where can I purchase one?" The system can use both an image matching database and a social network to find the answers to the questions. In an example, the system can identify the object image uploaded and provide a direct link for the purchase of the item.

If the system correctly determines a direct match from a database in communication with the controller, wherein the database includes a plurality of image objects and associate information, the user can verify that the system generated answer is correct. The system can store and record the relevant image object information into the database with a tag associating the user with the identified image object and image information, which the user can access in their personal favorites folders for future reference.

If the system does not identify the image object from the database, the system can rely on other users of the application to help identify and comment on the image object to determine the answers to the user's questions. For example, a friend network of selected recipients can have access to view the image object and associated question from the user, wherein the selected recipients can comment on the user's feed information related to the image object. Once a correct and verified answer is recorded, the system can save the image object information and associated image object in the database for future use. In addition, the user can save the search and search results to the user's favorite album and folders for future use.

In an example, the system includes a controller; a memory coupled to the controller, wherein the memory is configured to store program instructions executable by the controller; wherein in response to executing the program instructions, the controller is configured to receive a media file from a user via a user interface, wherein the media file includes an image of at least one image object; receive at least one selected recipient from the user; display the received media file on a user homepage, wherein the user homepage is accessible by the selected recipient; receive a recipient comment from at least one of the selected recipient via the user interface, wherein the comment includes received image object information associated with the image object, wherein the recipient comment is displayed on the user homepage in a thread associated with the image object; receive a verification request associated with at least one selected recipient comment; display a verification result on the user interface associated with the user; receive a confirmation associated with the selected recipient comment of the verification result from the user via the user interface to form a confirmed recipient comment; and display a visual confirmation notification on the confirmed recipient comment in the thread associated with the image object.

In an example, the system includes a controller; a memory coupled to the controller, wherein the memory is configured to store program instructions executable by the controller; wherein in response to executing the program instructions, the controller is configured to receive a media file from a user via a user interface, wherein the media file includes an image of at least one image object; generate a unique identifier for the received image object; search a media file database in communication with the controller to identify a match between the received image object and a matching stored media file, wherein the database includes a plurality of media files each associated with a stored unique identifier and stored image object information, wherein the generated unique identifier of the image object matches the stored unique identifier associated with the matching stored media file; communicate the matching stored media file to the user via the user interface; upon confirmation from the user, communicate the image object and associated image object information to the user via the user interface; receive a selected recipient from the user, wherein if the controller does not identify a match between the received image object and a matching stored media file within the database, display the received media file on a user homepage, wherein the user homepage is accessible by the selected recipient; receive a recipient comment from at least one of the selected recipient via the user interface, wherein the comment includes received image object information associated with the image object, wherein the recipient comment is displayed on the user homepage in a thread associated with the image object; receive a confirmation associated with the selected recipient comment to form a confirmed recipient comment; and display a visual confirmation notification on the confirmed recipient comment in the thread associated with the image object.

An advantage of the present system is providing an image uploading platform that includes image identification from a combination of sources including a database, web-based searches, and information from a plurality of individuals from a social network. In other words, the present invention is not merely reverse image search, but a multifaceted platform for obtaining information related to an image.

A further advantage of the present system is providing an image objection identification that does not solely rely on reverse image capture, but enables a plurality of users to comment and locate the image information, which can be used to update the database of image objects.

Another advantage of the present system is providing a streamlined application that allows users to obtain answers to everyday questions that could otherwise go unanswered. Further, allowing users to save their personal results into their individually created favorites folders for future reference allows the users to quickly and efficiently find the image information at a future date.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is an example of a user interface displaying a mobile application of the system including a page for notifications, camera function, and user feed.

FIG. 12 is an example of a dashboard of the system.

DETAILED DESCRIPTION OF THE INVENTION

Figure 2B:
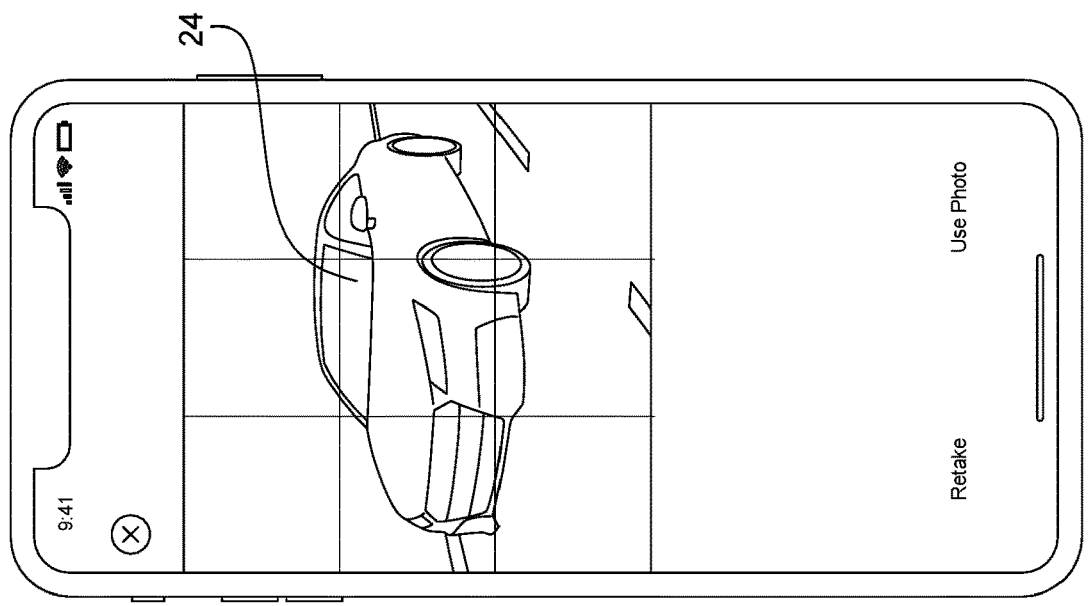
FIGS. 2A-2B are examples of user interfaces illustrating the camera function and cropping image interface.

The present system enables a user to provide a media file for the system to generate information about the media file. For example, the system can enable a user to provide a media file in text, photo, video, audio, or combinations thereof. The user can insert text, take a photo, upload an existing photo of an image object, record an audio file, upload an audio file related to an object, or combinations thereof. The system can enable a user to input at least one information question related to the image object. The system can search a database including a plurality of media objects (e.g., image objects, audio objects, etc.) and associated object information for a match with the uploaded media object. Although the primary example in the description is directed to image object and image object information, it should be understood that the image object could be an audio object (e.g., an object associated with the audio media file), text object (e.g., an object associated with the text media file), among others, and combinations thereof, wherein the object information can include any information associated with the media file.

If a match is found, the system can present via a user interface the associated image object information to the user. In an example, a user can confirm the proposed identification from the system, wherein upon confirmation, the system can store the image information in the image database. In an example, upon confirmation, the system can share the image information via a user interface to the user, and/or to the entire social network of selected recipients related to the user. In an example, after confirmation, the system can automatically save the image information to a folder associated with the user in a database for the user to access via the application.

In an example, the image information can include a website related to the image object, for example, the image object can be associated with a business or company and the image information can include the business website. In addition, or alternatively, the image information can include a physical location (e.g., address), contact information (e.g., business name, phone number, email address, map, etc.), brand name, purchase information, manufacturer information, among others.

Alternatively, or in addition to, the system can use a conventional internet search to locate the image information based on a reverse image, audio, or text search. Once the object information is located, the system can upload the image object information into the database for future use.

The system can provide a social network wherein users can share information among various subgroups of friends identified by the user. Alternatively, or in addition to, the user can grant permission to the public (i.e., beyond the user's friend group) to display the image object for feedback. The system enables users to communicate with each other, both privately and publicly. For example, users can communicate with each other via public and/or private messages. Alternatively, or in addition to, users can post and comment to each other's homepage or feed.

Users can choose their friend network individually by invitation. The system can also upload contact information from another contact application of the user. For example, the system can upload the contacts from a user's address book to request the contacts to download and register with the application to become friends of the user via the present mobile application. In other words, the present system can include an address book. Alternatively, or in addition to, the system can access the user's address book from a different mobile application (e.g., contact application, social media application, etc.) The system can categorize contacts in at least three ways, 'Friend' (e.g., a contact using application that user is already friends with), 'Add Friend' (e.g., a contact already using application but NOT friends with), and 'Invite' (e.g., a contact not yet using the application). Users can 'Add Friends' and/or 'Invite' contacts to join the present system mobile application and become friends. Users can receive push notifications to let them know if they have new friend requests so as they can accept or decline the request. Friends can be added or deleted from the users friend list and added and removed from Friend Groups and New Groups can be created.

The system can suggest friends to the user based on friends in common between the user and the proposed friend, interests, previous purchase history, geographical proximity, among others. In an example, the user can search friends based on demographics, sectors, business genre, etc. In an example, users can click (or otherwise select) on the profile picture or name of a user that is not their friend, but who has commented on a post in the feed/thread they are following. The first user can choose to add this user as a friend (e.g., send them a friend request) or send them a private message. As a result, the system allows users to add friends from people not already in their friend network. In an example, if a user uploads an image object of a car, the user can request feedback from users related to automobile retail and services. In such example, only the specified sector of individuals will be able to publicly post the answers to the questions of the user related to the uploaded image object.

In an example, when the system does not find a direct match from the database and/or general internet search, the system can post the image object and related questions to other users within the system, for example, the selected recipients of a user's friend network. In other words, the other users can be used to answer the questions posed by the user about the uploaded image object. As a result, the system can provide the user the words they were looking for to be able to search what they are looking for, which is a powerful function in helping users find the answers when they didn't previously have the words to do so. Once an answer is provided by a second user and verified and confirmed by the first user, the system can store the image information in the database for any future inquiries related to the image object.

For example, the system can request image information related to the uploaded image object only from the user's friend set. In other words, only the selected and authorized friends of a user would have knowledge of the image object relating to the user. Alternatively, or in addition to, the system can request image information related to an uploaded image object anonymously. In other words, the system can request information related to an uploaded image object without disclosing the user that is requesting the image information. Moreover, the user can select to request image information from the general public and/or non-friends in the network.

The system enables users to create a plurality of folders and/or albums to save the uploaded image and associated image information generated by the system. The user can access the albums to access the image information and/or to send the image information to other users within the system.

As shown in the figures, the system can provide a mobile application downloadable to a smart device, wherein the application allows each user to be associated with a user account including the user name and contact information, including but not limited to email address, physical address, phone number, demographic information, interests, etc. The system can request user preferences of any topics, including, but not limited to, clothes, cars, shoes, accessories, travel, crafts, marketing, services, gifts, among others. The mobile application can, upon user permission, access a user's contacts stored on the smart device, the camera of the smart device, albums and photos stored on the smart device, and other social media accounts of the user. The system also provides a search function for a user to locate and add other users to their friend group. The system can also suggest other users for the user to add as a friend based on common contacts, preferences, interests, etc.

As shown in FIG. 1, the system 10 can access a plurality of on the user interface 12 for the user to manipulate the different functions of the mobile application. In an example, a user can navigate between modules including a camera screen 14 that can be the live camera screen for capturing an image and/or video. The system can include a notification module 16, and a user feed module 18. The system can display icons at the bottom of the user interface for the user to select different screen and view options.

Figure 2A:
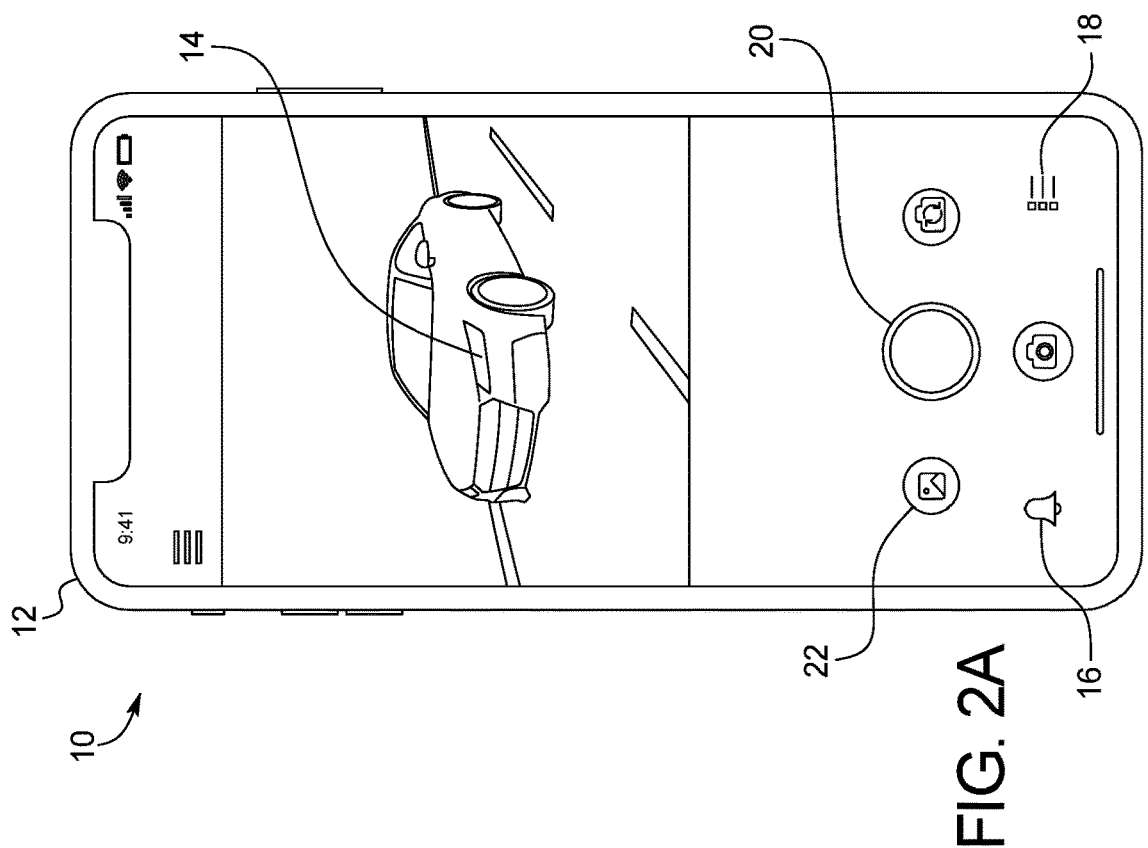

As shown in FIGS. 2A-2B, the user can select a camera icon displayed on the user interface, wherein upon selection the system can enable the user to take a photo 20 and/or select an image from a photo library 22 in communication with the smart device and mobile application. The system 10 can include an option wherein the camera view installed applies a fixed crop on all acquired images to preserve the image without chopping or distorting the image used in the analysis. Users have the option to zoom or place the photo taken or selected in the cropped view. In an example, a user has the option to crop and/or resized the photo using a cropping interface 24. In an example, the system can automatically resize the image selected or taken to fit properly in every other screen where the photo appears in the system (e.g., feed, favorites, posts, dates, time stamped, among others). In an example, the user can retake a photo or use the photo.

Figure 3:
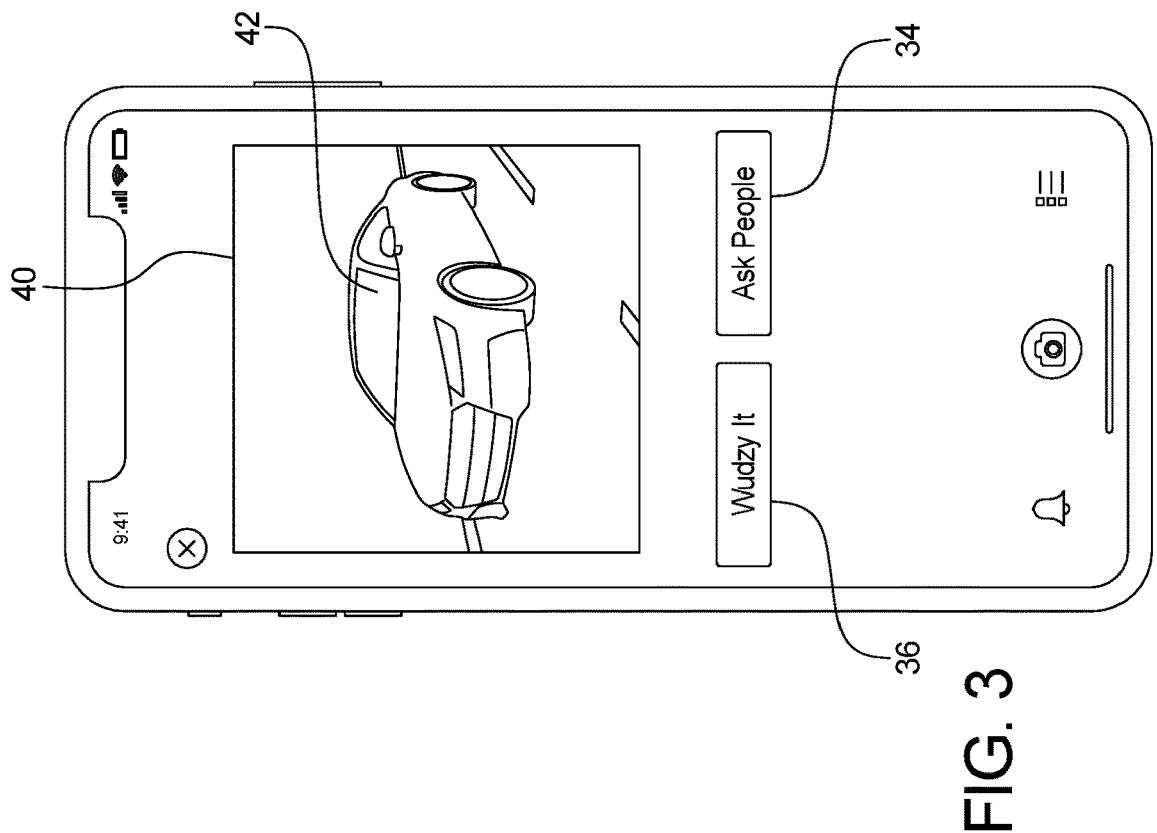
FIG. 3 is an example of a user interface displaying an image including activation links for sourcing the answer.

As shown in FIG. 3, once the user selects a photo 40 of an image object 42, the system 10 can upload the photo 40 for the user to search for a result using the system generated answer or by asking other users through 'Ask People' function. In an example, the system uploads the image to the user's network (e.g., personal feed 30, recipient's feed, public network, etc.). The system can display the input user question 32 related to the image object 42 with the photo 40 or alternatively on a different screen. In an example, the user can select at least one image object within the photo for searching. For example, the photo can include an image of a car, purse, and phone, wherein the user can select the car as the image object for the system to focus the search around.

Figure 4:
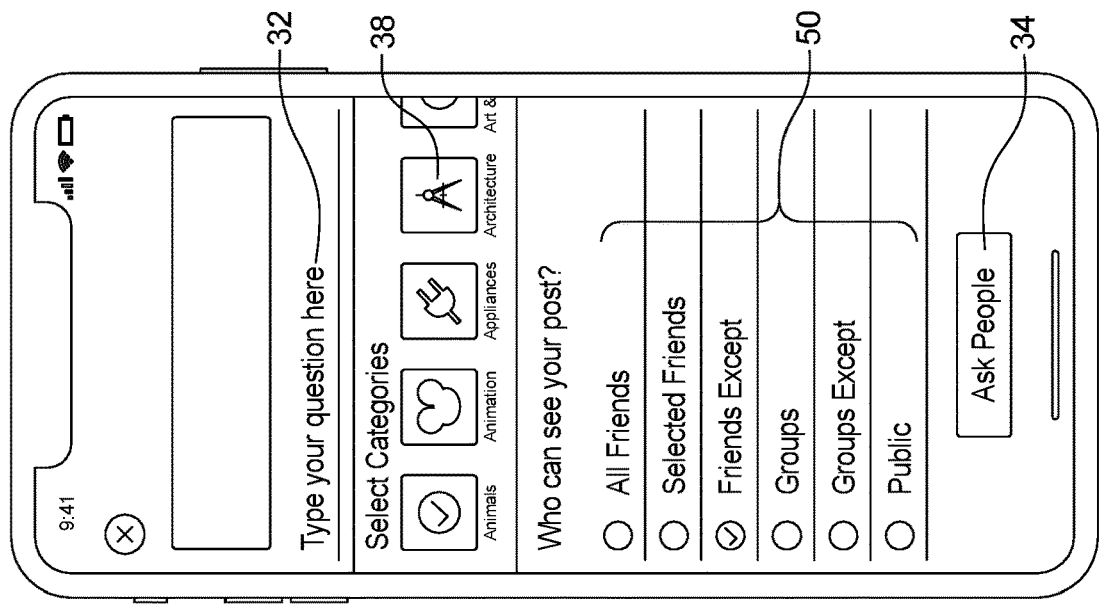
FIG. 4 is an example of a user interface displaying the input image with related question, a category of the image, wherein the question can relate to a selection of which recipients the user desires to disclose the image and question.

As shown in FIG. 4, the system can provide a display prompt for the user to type or write in a question 32 related to the image object in the uploaded photo. As shown in FIG. 4, the user can select at least one category relating to the image object post such that other users who have chosen to receive notifications regarding the posts in that category can receive notifications about the post and can comment to provide an answer to the question from the first user. In an example, the user can select recipients 50 from all users, all friends, individual friends, subsets of friends, individually selected friends, individually excluded friends, interest groups users, non-friends (e.g., public), and/or users related to a particular topic to receive the user's post including the uploaded photo of the image object and the related question. In an example, users within the interest groups and users related to a particular topic may or may not be within the user's friend network. The user can select an "Ask People" function 34 to display the image object and associated question to the selected recipients feed for their viewing and feedback. Alternatively, or in addition to, the user can select for the system to research the answer by selecting the Internet research button 36.

In an example, the system requires the user to input a question 32, select a category associated with the question 38, and select which users or groups of users (e.g., recipients) 50 can see the question, before the user can select the "Ask People" function 34 on the user interface. For example, the category can be selected by text or via a drop-down menu. Alternatively, or in addition to, the user can perform a search to find the appropriate category associated with the question and/or image.

Figure 5:
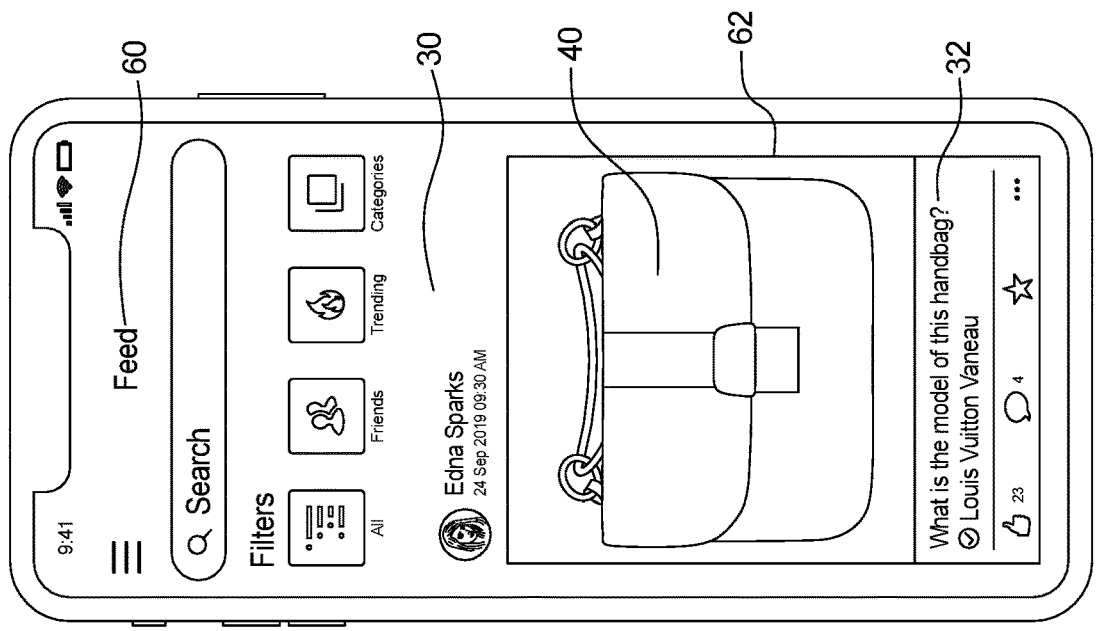
FIG. 5 is an example of a user interface displaying a user's feed including a plurality of posts related to the user.

FIGS. 5A-5C illustrates a user's feed 60. In an example, a plurality of posts 62 from friends of the user can be displayed, wherein each post can include an image 40 and associated question 32, and wherein applicable the confirmed answer. FIG. 5 displays the filters by which a user can 'filter/narrow' the posts that are displayed on their feed. The filters can include 'All' which can show all posts made by users who have chosen the 'Ask People' function—displayed in chronological order. 'Friends' which displays posts made by users' friends who have chosen the 'Ask People' function. 'Trending' which can show the most popular/trending posts as dictated by the greatest number of likes or comments for posts from users who have chosen the 'Ask People' function. 'Categories' which can show the posts relating to the categories that the user selected at sign up to receive notifications/posts regarding. Users can 'Like', see who has liked and or made a comment, make their own public comment and save a post on the Feed. The user can also search for posts, images and people via the search bar. The user can also stop notifications (resume notifications), hide, edit or delete their own post or someone else's post. The user can edit or delete their own comments and like, reply to, verify 84, tag friends, report or block (also undo report and unblock) someone else's comment. Users wishing to report a user and/or their post or comment can do so via the relevant ellipsis in the feed and will be taken to the report page where they can be required to give reason for the decision to report a user and or their post/comment and where they can message administrator regarding the complaint and unfollow or block the user.

Figure 6:
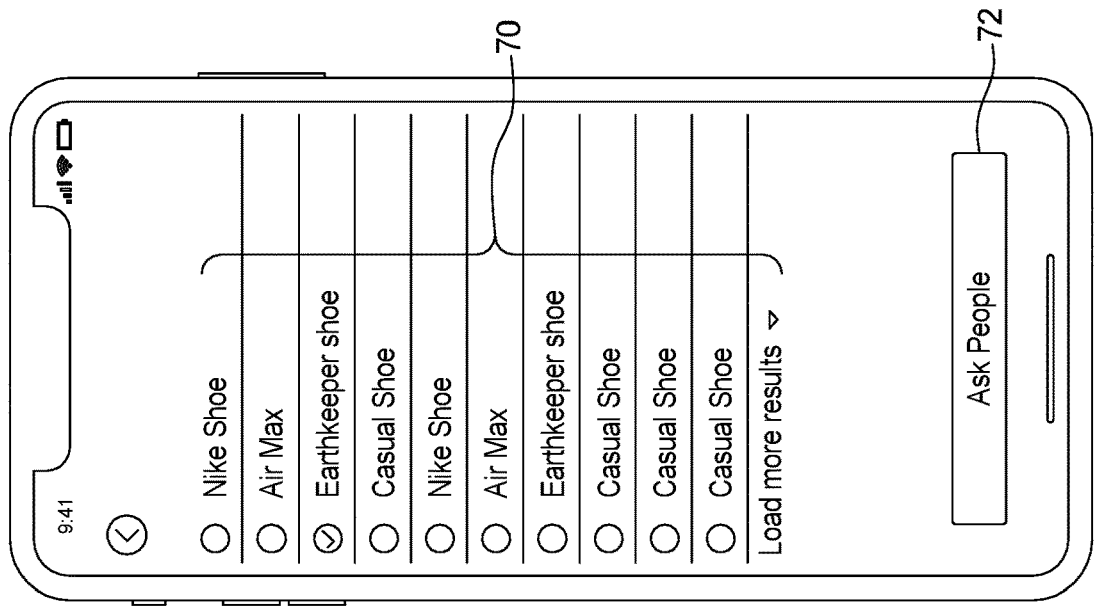
FIG. 6 is an example of a user interface displaying system generated answers of a user image.

In an example, as shown in FIG. 6, if the system generates a match between the image object of the uploaded photo and an image object in the database, upon user permission, the system can upload the image object information to the user's feed and/or privately notify the user (e.g., send a private message to the user with the image object information), wherein the user can decide whether or not to post the information to the user's feed for the friend network to view. In an example, the results are kept private only to the user. The system can also post or notify the user image object answers to the user's question.

As shown in FIG. 6, the system can display a plurality of results 70 to the user, wherein the user can select a result to be directed to the corresponding website or other information in the result. If the user does not find the answer by using the link in the results, the user can go back to the list and select a different result link to explore. This can be repeated until the user verifies, or otherwise confirms, the result with the appropriate image information the user was seeking.

Figure 7:
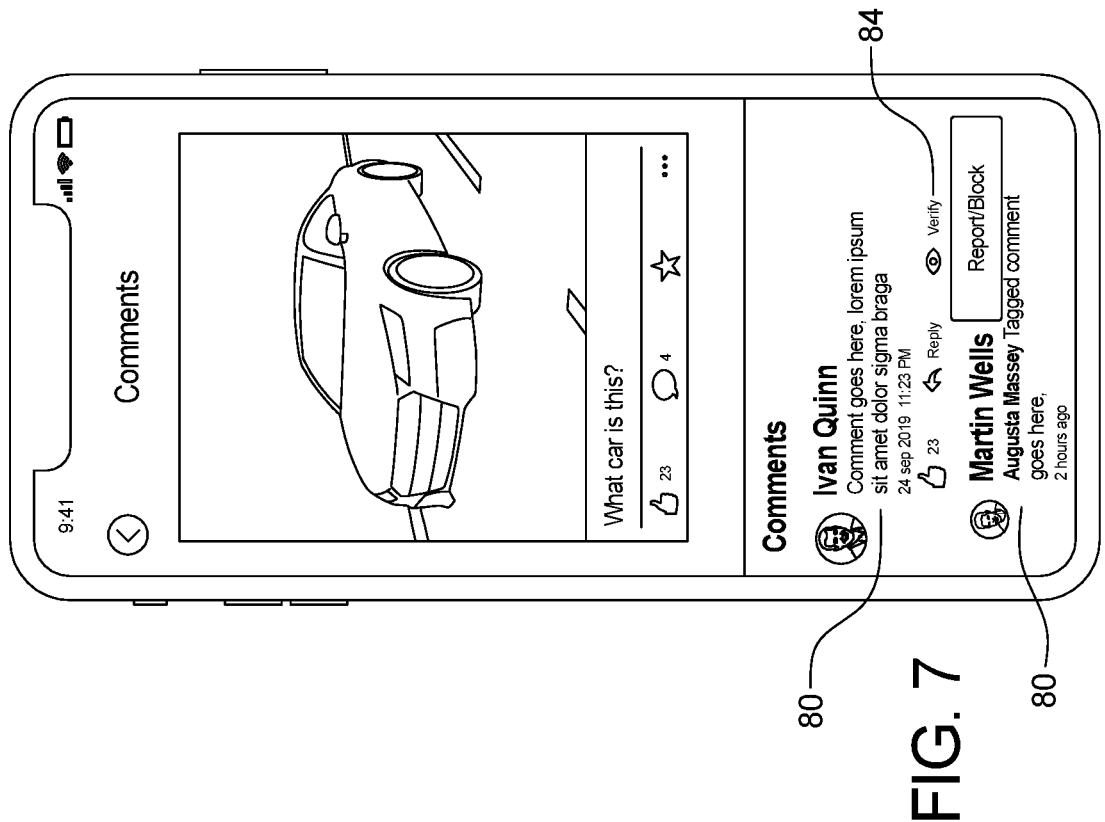
FIG. 7 is an example of a user interface displaying recipient answers to a user question of a user image.

Instead of using the system to generate the match based on the database, the user can select "Ask People". For example, the user can select to "Ask People" 34 wherein the system can display the uploaded photo and object image question to the selected recipients the user specified, as shown in FIG. 7. Alternatively, or in addition to, if the system does not generate the image information based on the database and/or the system presents image object information to answer the question the user does not confirm, the system can shift the inquiry to the "Ask People" function.

If the user chooses "Ask People" 34, the selected recipients can send the proposed answers 80 directly to the user via private message personalized 'push notification' and/or post the proposed answer on the user's feed. For example, another user's comments of proposed answer 80 can be added to a thread on the user's feed/homepage. Other users can reply or comment on other user's proposed answers. Users can 'tag' friends and/or other users into a thread related to the user post, for example, by typing '@' and the username into the comments section so that user can now receive push notifications and get information regarding this post/thread. The user can stop, hide, report or block replies on the user's feed from other users and/or exit or end the conversation. In an example, the user can confirm and edit the proposed answer including the correct image object information before the proposed answer is uploaded to the user's feed and stored in the database.

In an example, only the user who uploaded the photo of the image object can 'verify' and/or 'confirm' whether a second user's proposed answer is correct. The system can display a 'verify' prompt/icon 84, to be associated with each second user comment, wherein the user can select the "verified" prompt when the user confirms the second user's comment is correct. The system can be used to verify a second user comment by selecting the 'verify' prompt that can enable a user to edit the comment or answer to the words the user wants the search engine to use in the verification process. For example, once the user has affirmed or edited the second user comment, the system can use the comment and return web results for the words searched. Once the user confirms that the web results render the correct image object information, the user can confirm the second user's comment/answer.

Once a comment on the user's feed associated with the uploaded image object is confirmed, every user that has commented and/or is following the conversation feed is notified via push notification, of the confirmed image object information. Each user has the option of saving the associated image object information to their own respective favorites folder for future reference. Once the correct image object information is identified, the system can display a "Solved" stamp, or similar illustration on the conversation feed to notify future viewers that the question has been answered/solved. The correct answer can be illustrated in bold or otherwise highlighted under the question and related photo, for example, with a 'green tick' to indicate it is the confirmed answer. In the comments below the photo, question, and confirmed answer can be the comment made by the user who provided the correct answer. The correct comment can be moved to the top of the comment thread and have a green background with the words 'Confirmed Answer' displayed in a corner of the comment section to further demonstrate that the comment was the correct answer. The user who provided this correct answer can receive a 'push notification, congratulating the user for providing the correct answer and updating the user score.

In an example, the user's post will be marked as "solved", with a red stamp that can appear on a corner of the image indicating in all instances in the future where the post appears in the application that the post is solved. The answer can be displayed with a green 'tick' icon and text below the question under the related image. The answer or answer prompt/link can be displayed on each instance the post appears within the application.

Figure 10:
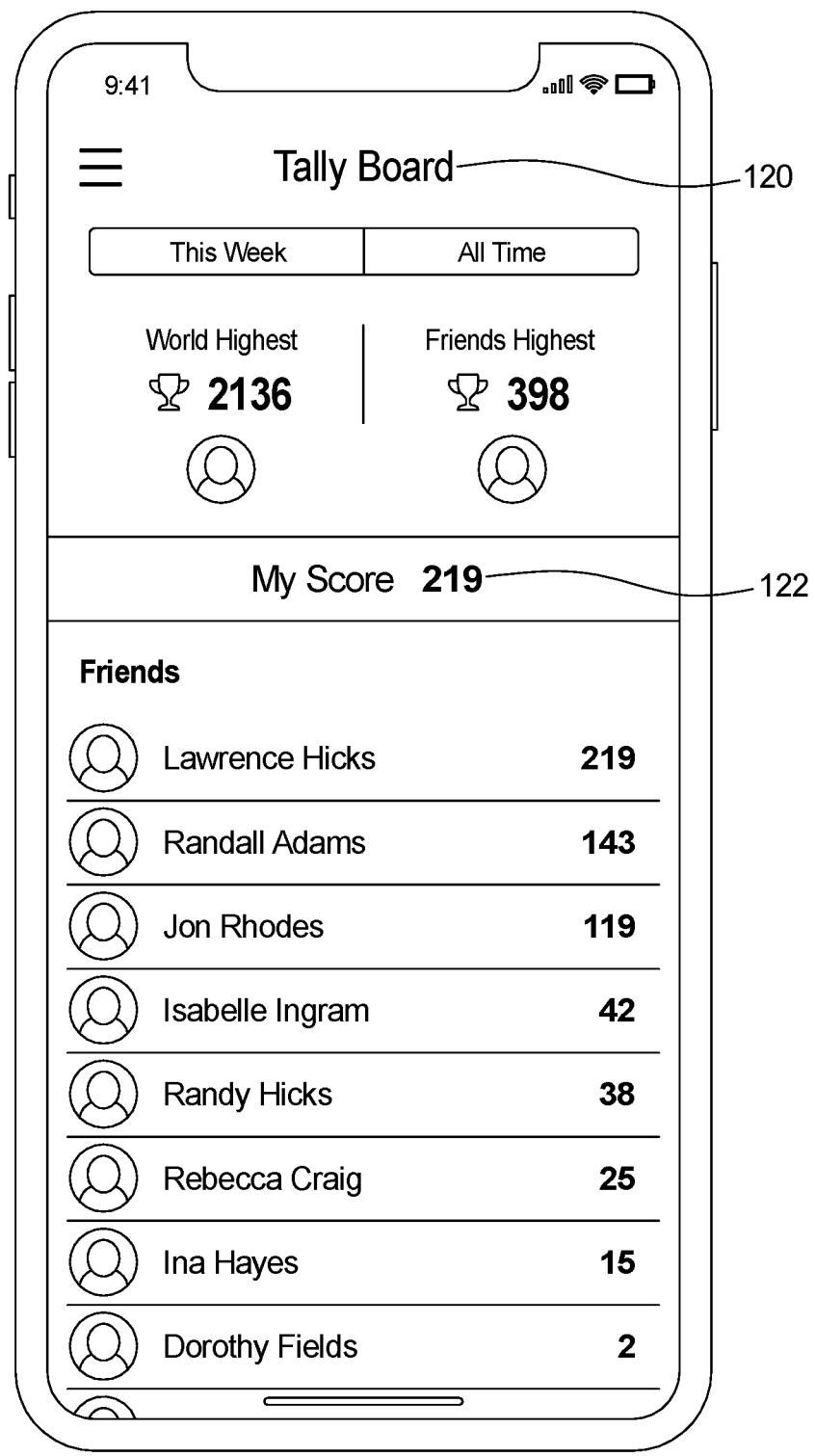
FIG. 10 is an example of a user interface displaying a tally board including a score associated with a user and friends.

The user that proposed the correct image object information is notified of the confirmation. For example, the system may display a congratulatory display for the user associated with the correct image object information. Further, the system can award points to the user associated with the correct image object information. In an example, the system can generate an associated score 122 for each user, wherein the generated score indicates the amount of cases the user has correctly identified. A user can use and view the score to access whether the answer provided by a particular use is reliable. As shown in FIG. 10, the system can include a tally board 120 wherein the user that proposed the correct image object information is updated with an increased score. In an example, the tally board 120 can include the total amount of correct answers for each recipient, the weekly score for the current week, the percentage of correct answers of the recipient, the frequency of the recipient answers, among other metrics. The metrics can be used to calculate the score 122 of the recipient, which the user can use to determine the reliability of the recipient's answer. All users who have not 'opted out' in the settings can receive a weekly push notification announcing the winner of the week (e.g., the user who has earned the most points in the current week) and the 'all time leader' (e.g., the user who has the highest overall score). There can be status levels awarded to users when certain point levels are achieved. Levels include beginner, novice, bronze, silver, gold, platinum, diamond, master, jedi, amongst others. Users can receive notifications when they are nearing and have achieved new status levels.

Figure 9B:
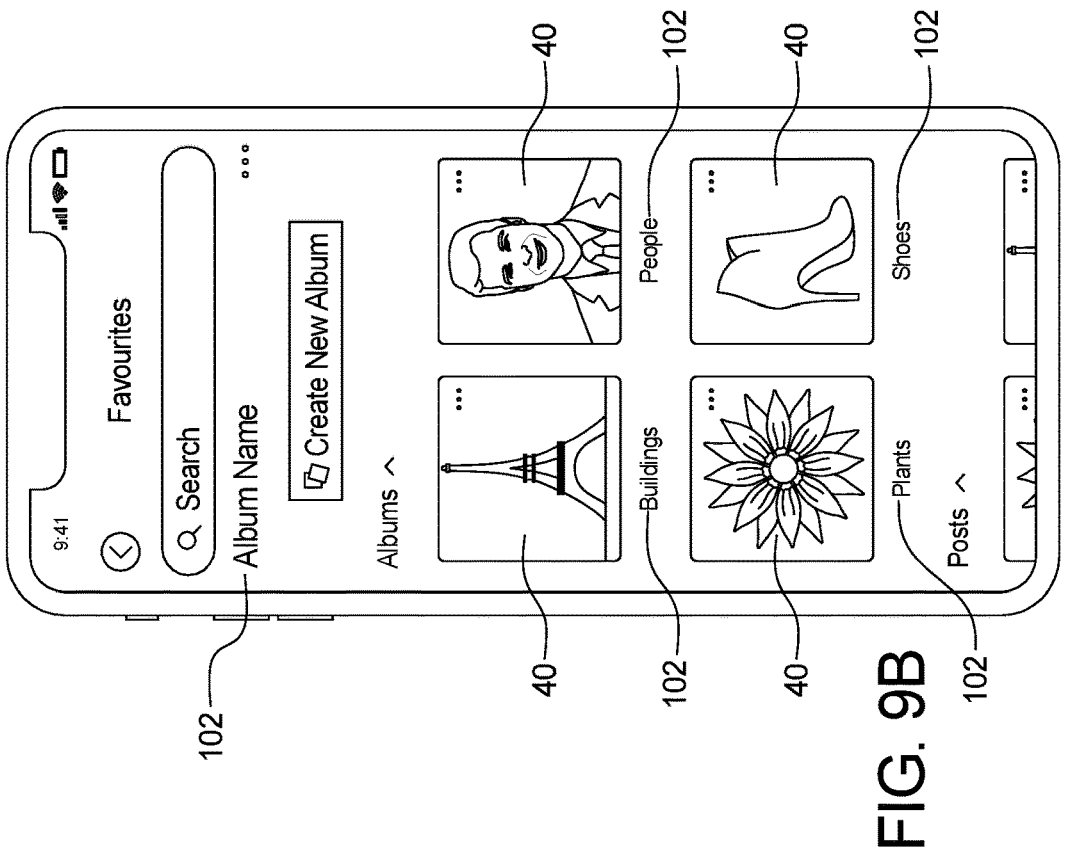
FIGS. 9A-9B are examples of a user interfaces displaying favorites, albums, and category organization of the user images.
Figure 9A:
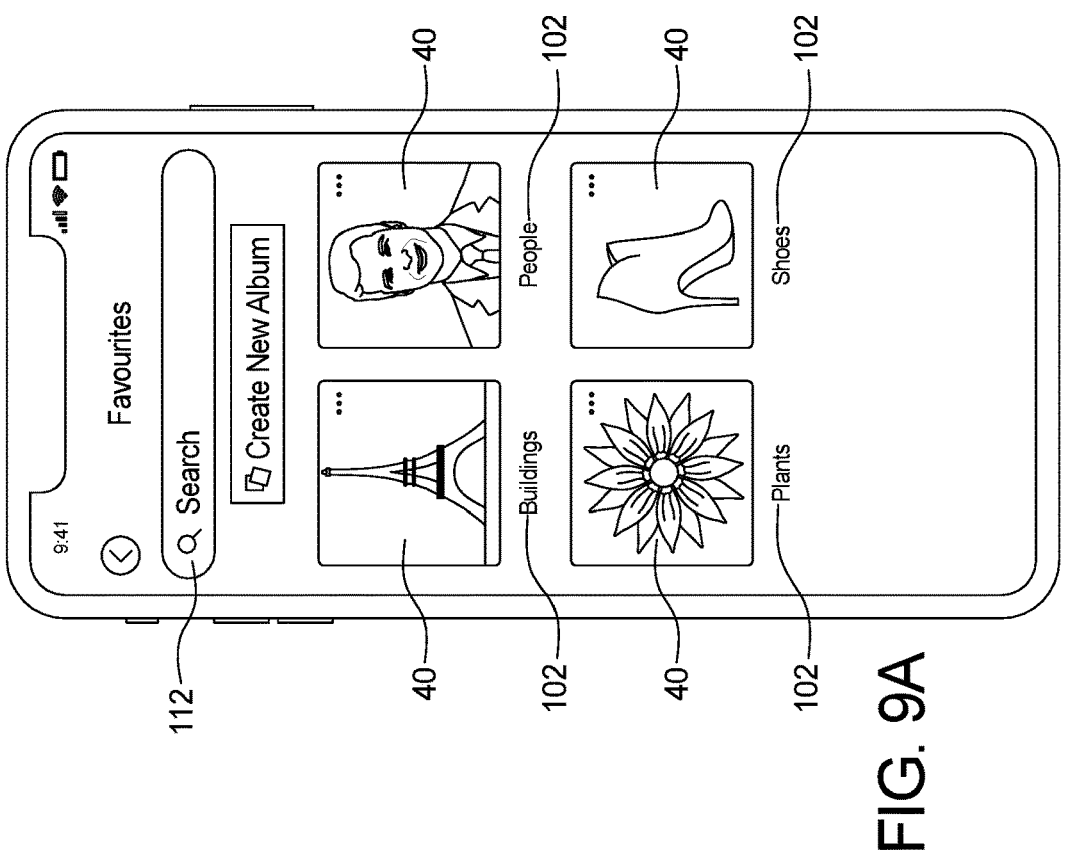

As shown in FIGS. 9A-9B, the system can save and organize a user's uploaded images (posts) 40 into various favorites albums, sub-albums, among others. For examples, a user can search for a photo, album, or sub-albums by inputting an album name in the search bar. The system can generate search results, wherein a user can select an image photo from the album generated in the search results. The user can create albums and/or folders, and select among the uploaded photos to include into particular albums.

In an example, posts that are saved to the favorites albums and sub albums can be tagged with the confirmed answer, which can appear below the photo with the date and time stamp of when the image was saved and/or confirmed. A user can select the saved image/post in the user's albums with the tagged answer, wherein upon selection, the user can be taken to that relevant website and/or search result to easily and efficiently find the relevant information relating to the image. Posts that were solved by the 'Ask People' function can have the 'solved stamp' on the post, wherein upon can take user to the feed including the confirmed answer.

Image objects and corresponding image object information that are saved through the automatic search function (i.e., not the "Ask People' function) may not have the solved stamp on the post. As a result, users can click on this image or the label beneath the photo image to be redirected to the web results (or to the other result formats) regarding this image.

In an example, a user can post a photo of an image object on a user's feed, wherein the selected recipients can comment on the user's feed, wherein the comment is associated with image object information. In an example, the user must approve the post before it is displayed on the user's feed. Alternatively, the recipients' comments are automatically displayed on the user's feed. Once the user verifies and confirms the correct image object information from the plurality of recipient posts, the correct image object information is displayed first in the feed for future reference (e.g., within the thread of the conversation). The posts of the recipients can include the recipient's name, user profile, contact information, among others. For example, other recipients can comment or reply on the recipient post publicly via the Feed, and/or directly with the recipient via private messages. Each comment within the thread can include a thumbs up icon and a thumbs down icon that viewers can select to suggest liking or agreeing with the comment. Each comment can include a total of "likes" or thumbs up selections to indicate a positive and/or negative consensus of the object image information in the answer.

For example, the system can enable a user to save a selected photo and related answers including links, documents, sources, etc. into the user's favorite's album. In an example, the user can select a favorite icon on the user interface (e.g., star, heart, check mark, etc.) to automatically save the image and information to a favorite album. Alternatively, or in addition to, the system can save the image and information into a selected existing album and/or can create as many new album or sub albums as they want among others. In an example, the system automatically time stamps the image with the date and time of taking the image, and/or at the time and date of saving the image to the favorite folder.

The system can also include a pen icon on the user interface when displaying the image, wherein upon selection of the pen icon, the user can input/edit a label associated with the image via text or drop-down selection. The system can also provide the creation of sub-albums within parent albums. For example, a user having chosen a parent album from a drop-down menu of which the user wants the image saved, the user can create sub-albums within a parent album. Users can edit the name of an album, move an album/sub-album into another album, and/or delete an album. The user can edit the name of an individual post within an album, move a post to a different album/sub-album, and/or delete a post.

The system can enable push notifications, wherein even if the user is not actively engaged with the mobile application, the system can display notifications on a user's user interface on the smart device. The notifications can include incoming posts, messages, friend requests, comments, among others. The user can also select stop notifications, wherein the user can still view the activity related to the post, but the user will no longer receive notifications. The user can also edit, hide, and/or delete the post after publishing, for example, by accessing the relevant prompt (e.g., ellipsis) in the feed and choosing the desired action or alternatively users can turn on/off selected notifications in the settings. The settings page can allow users to turn on off notifications for private messages, comments, winner of the week, friend requests among others. Users can also view and edit who are their 'blocked contacts'. Importantly users can also 'delete' their account on the settings page. Users are given to warning prompts to make sure they want to delete their account Similarly, the user receiving the posts can select to stop notifications, hide posts, block or report users, only receive posts from certain users, only receive posts in selected categories, only receive posts within certain times and days, among others.

The system can include a tutorial module that allows users to learn how to use the system including a mobile application. The tutorial can be text tips and/or an instructional video describing the mobile application. The system can include a frequently asked questions (FAQ) page to help users with any questions or issues they may have regarding the application. Furthermore, users can contact administration via the 'Contact Us'.

Figure 8:
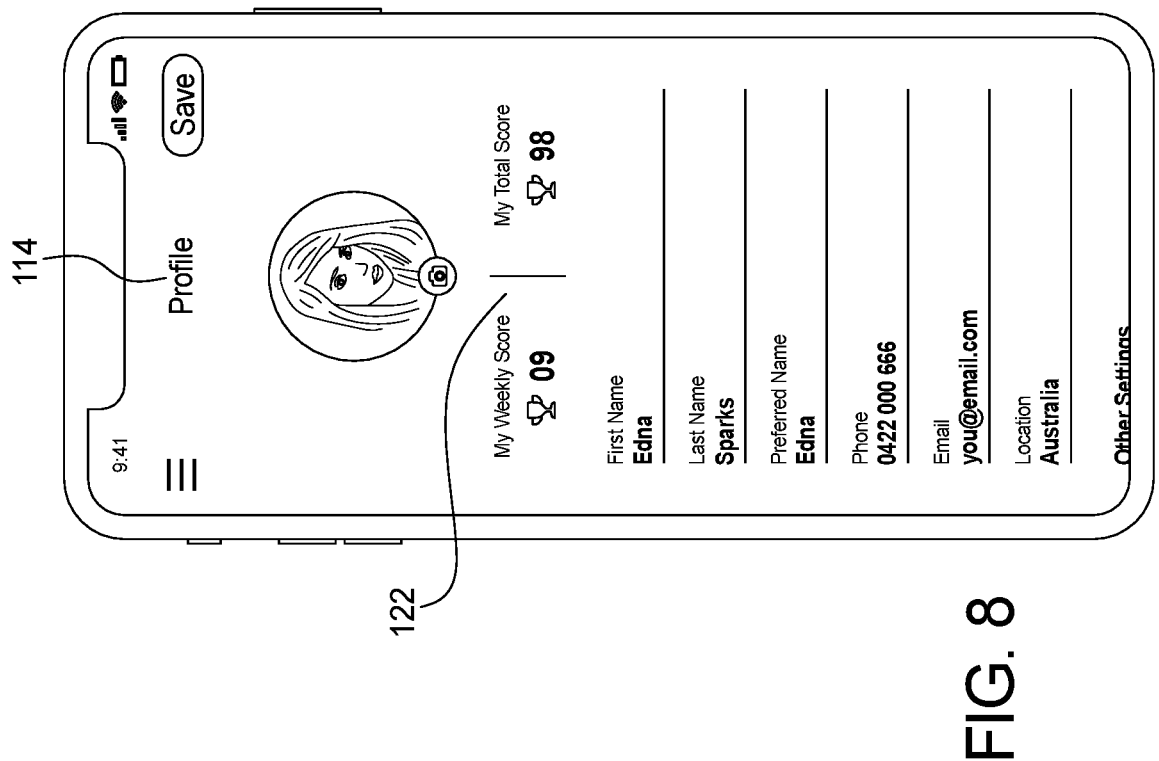
FIG. 8 is an example of a user's profile page, displaying their image, contact details, selected categories, points score and related functions to their account.

As shown in FIG. 8, the system can provide each user with a personal profile, that can display the user's photo, first name, last name, preferred user name, mobile phone number, email, location, the user's posts, the number and links to the posts the user has commented or answered on, the user's score, among others. The profile page can include a link to the selected categories so they can edit their choice of categories, that they receive notifications about, a link to edit or change the password, and a link to make their profile private so that only the user friends or selected individuals can see the user's profile page.

In an example, the system can include a map module, wherein the object information can include location information, wherein the system can provide a map identifying the location information related to the object in the image. For example, if the user confirms a result for a certain type of car, the system can identify, visually on a map, locations of dealerships for the type of car in the image.

Figure 11:
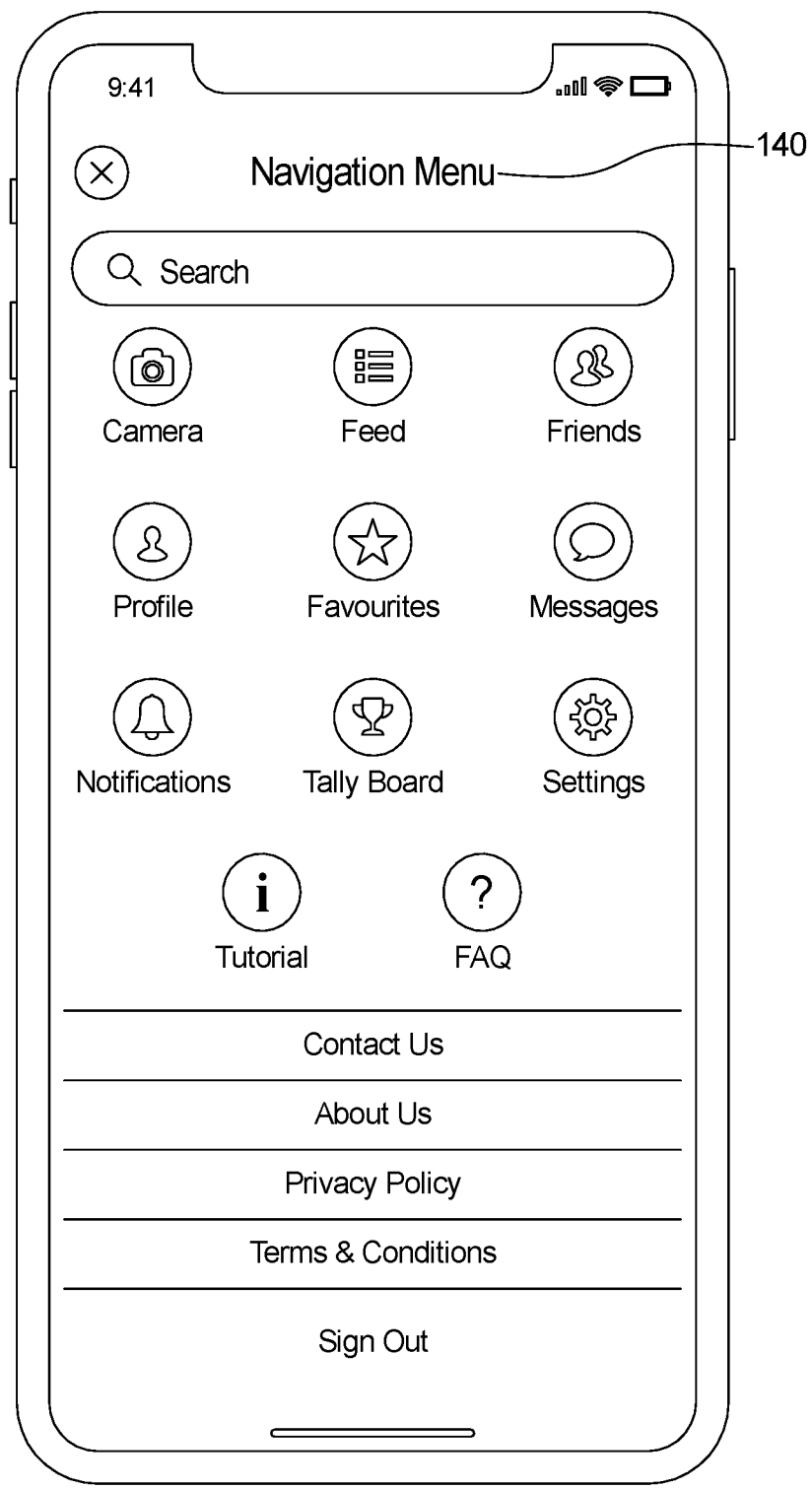
FIG. 11 is an example of a user interface displaying a plurality of navigation tabs to access various functions of the system.

As shown in FIG. 11, the system can provide the user with a personal Navigation Menu 140 to move easily and efficiently through the various screens and functions of the system. The Navigation Menu can be accessed via the 'hamburger menu' 128 displayed in many screens throughout the application. In an example, the user can search for any person, post or thing among others via the search bar, which will take the user to the relevant post within application. Users can access the camera to take photos and upload images to search and find answers for using the system generated answers or with assistance from other users, they can directly access the feed, their friends list, their own user profile page, the favorites albums, the private messages, the notifications, the tally board, their settings, tutorial, faq page, contact us page, about us page, privacy policy page, term & conditions page, and the sign out of the application.

Figure 12:
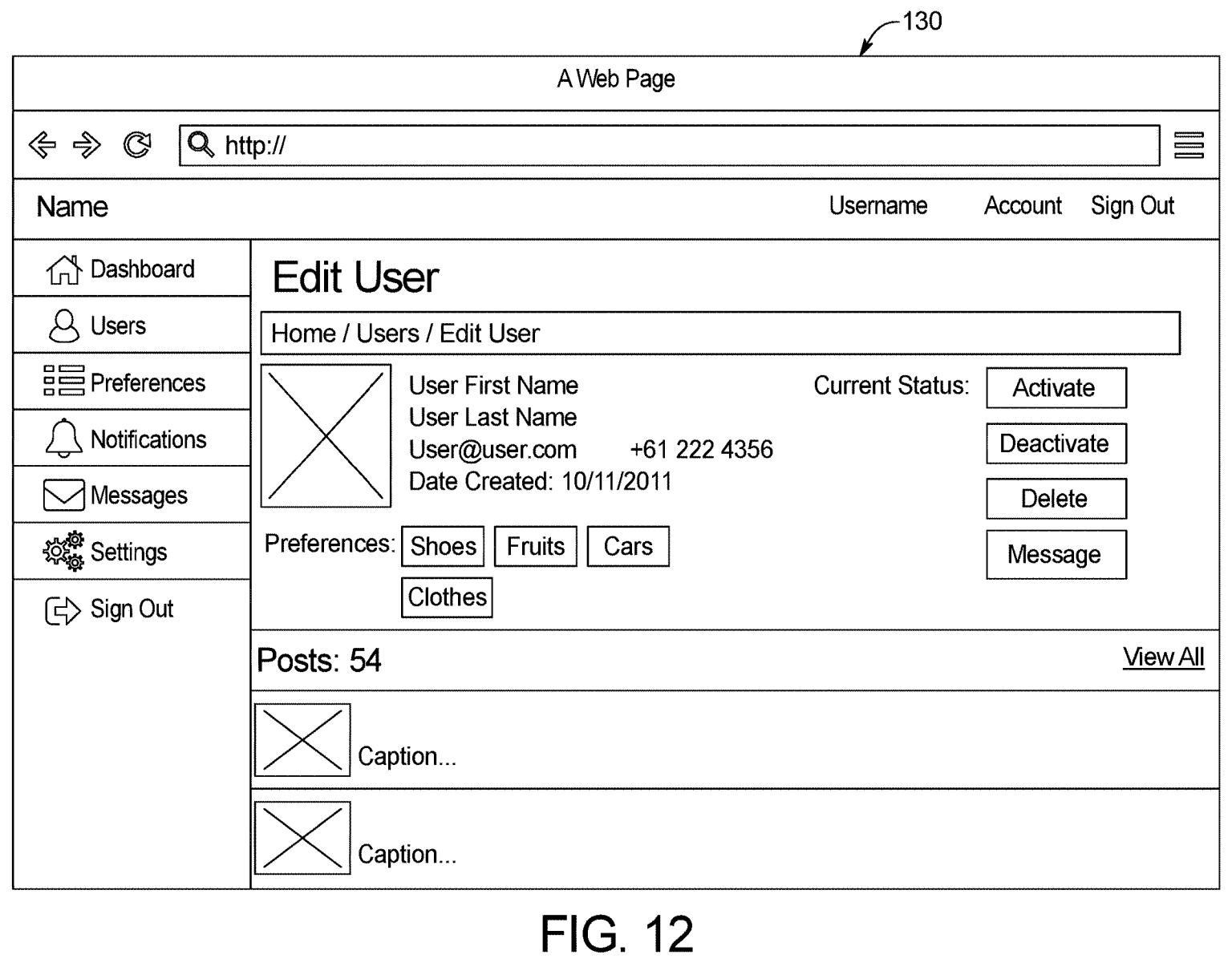

In an example, the system 10 includes a dashboard 130 for a user and/or administrator to edit and select the users, preferences, notifications, messages, and settings of the system including the mobile application, as shown in FIG. 12 The dashboard 130 can include user information such as identification, name, personal information, preferences, status, posts, comments, among others.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

The invention claimed is:

1. A system comprising:
a controller;
a memory coupled to the controller, wherein the memory is configured to store program instructions executable by the controller;
wherein in response to executing the program instructions, the controller is configured to:
receive a media file from a user via a user interface, wherein the media file includes an image of at least one image object;
generate a unique identifier for the received image object;
search a media file database in communication with the controller to identify a match between the received image object and a matching stored media file, wherein the database includes a plurality of media files each associated with a stored unique identifier and stored image object information, wherein the generated unique identifier of the image object matches the stored unique identifier associated with the matching stored media file;
communicate the matching stored media file to the user via the user interface;
upon confirmation from the user, communicate the image object and associated image object information to the user via the user interface;
receive a selected recipient from the user, wherein if the controller does not identify a match between the received image object and a matching stored media file within the database, display the received media file on a user homepage, wherein the user homepage is accessible by the selected recipient;
receive a recipient comment from at least one of the selected recipient via the user interface, wherein the comment includes received image object information associated with the image object, wherein the recipient comment is displayed on the user homepage in a thread associated with the image object;
receive a confirmation associated with the selected recipient comment to form a confirmed recipient comment; and
display a visual confirmation notification on the confirmed recipient comment in the thread associated with the image object.

2. The system of claim 1, wherein the media file is a video.

3. The system of claim 1, wherein the media file is a photo.

4. The system of claim 1, wherein the image object information includes a website related to the image object.

5. The system of claim 1, wherein the image object information includes an identification of a business associated with the image object.

6. The system of claim 1, wherein the controller is further configured to update the database with the recipient comment including the image object information associated with the image object.

7. The system of claim 1, wherein the controller is further configured to update a score associated with the selected recipient associated with the confirmed recipient comment.

8. The system of claim 7, wherein the controller is further configured to display the score of the selected recipient to the user.

9. The system of claim 7, wherein the score is based on an amount of confirmed recipient comments associated with the recipient.

* * * * *